March 18, 1947.  T. C. HILL  2,417,491
UNIVERSAL FLUID JOINT
Filed Sept. 9, 1944  2 Sheets-Sheet 1
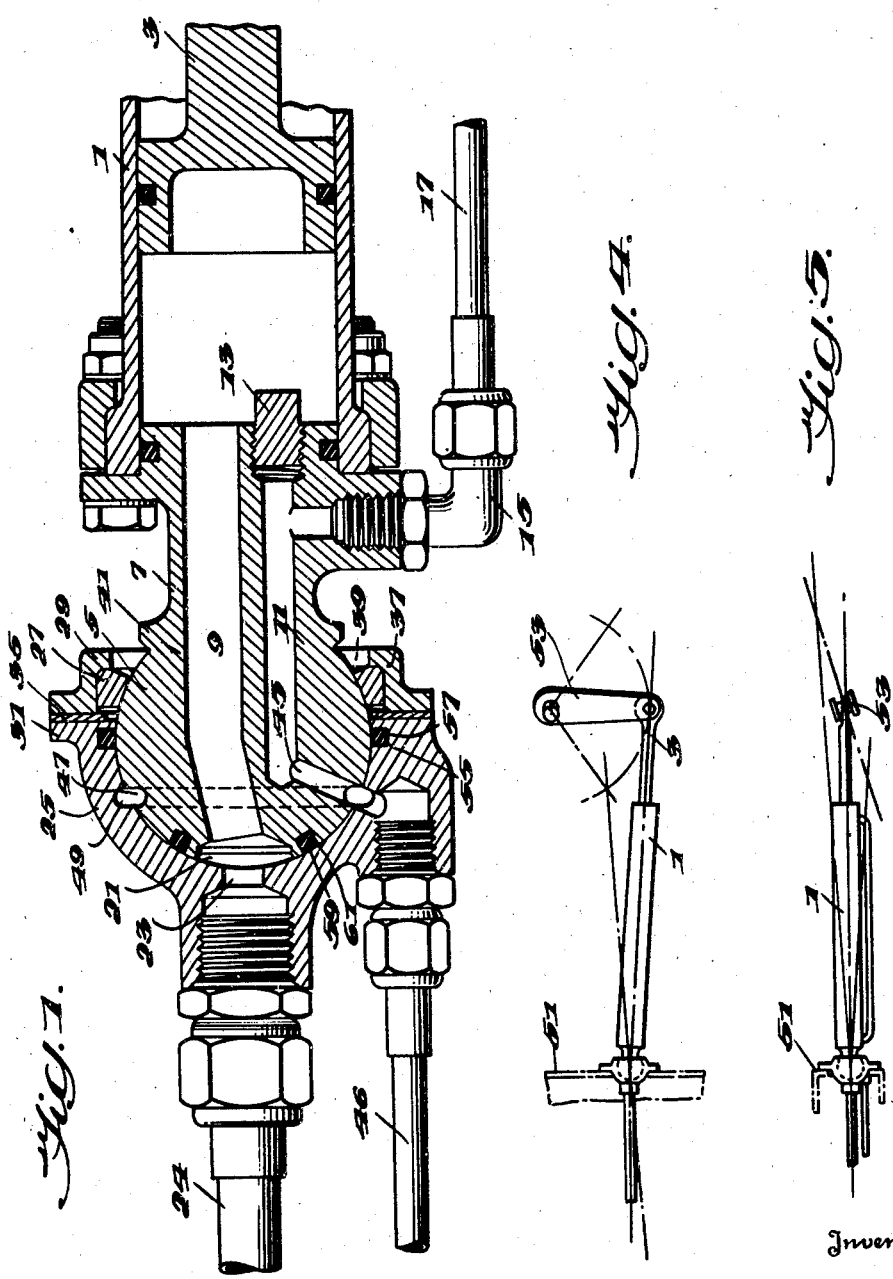
Inventor
THOMAS C. HILL
By Donald W. Farrington
Attorney March 18, 1947.  T. C. HILL  2,417,491
UNIVERSAL FLUID JOINT
Filed Sept. 9, 1944  2 Sheets-Sheet 2
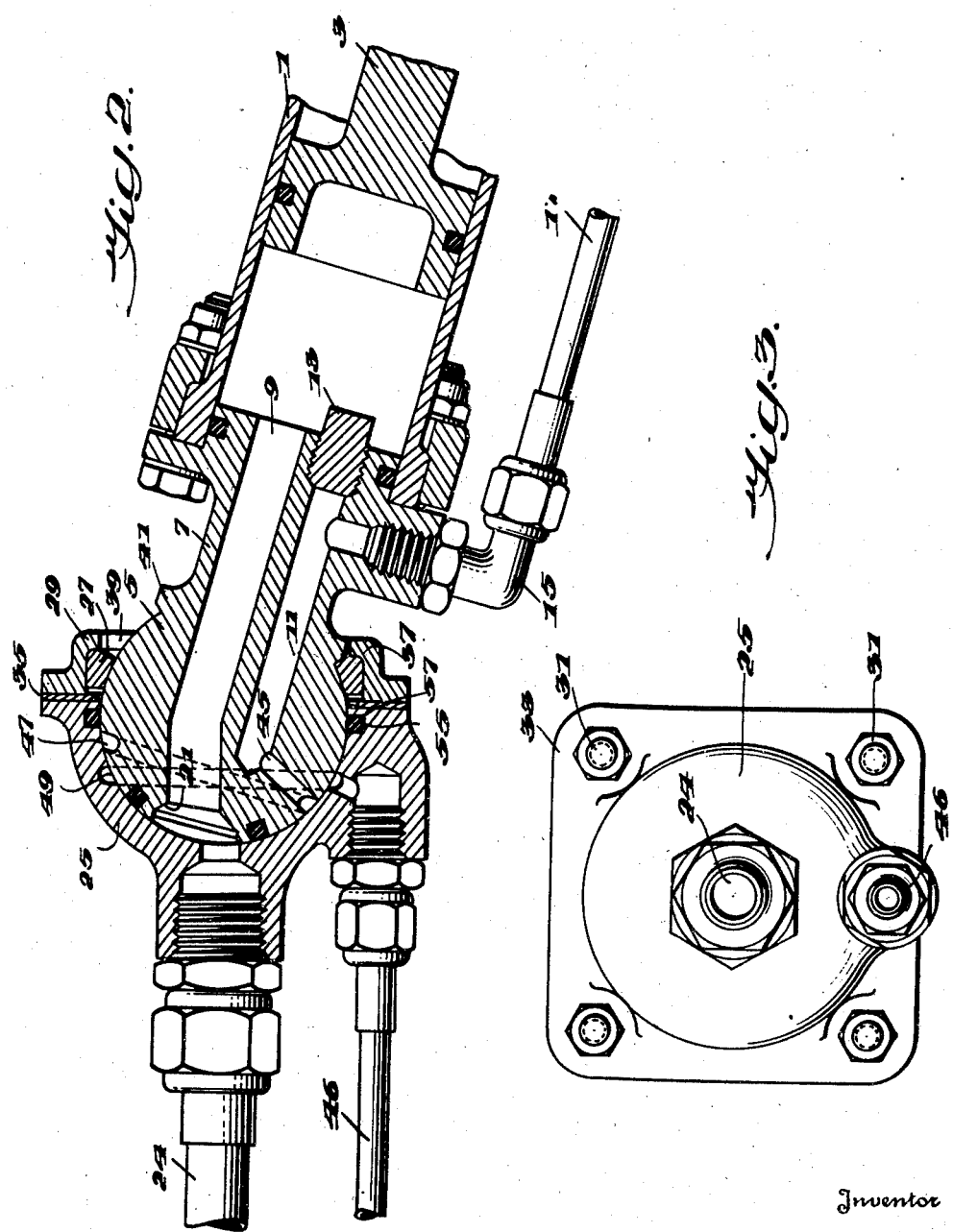
Inventor
THOMAS C. HILL
By Donald W. Farrington
Attorney Patented Mar. 18, 1947

2,417,491

UNITED STATES PATENT OFFICE 2,417,491

UNIVERSAL FLUID JOINT

Thomas C. Hill, Parkville, Md., assignor to The Glenn L. Martin Company, Middle River, Md., a corporation of Maryland Application September 9, 1944, Serial No. 553,355

5 Claims. (Cl. 285—91)

This invention relates to a universal pipe coupling wherein two fluid lines may be connected through a movable joint to some type of hydraulic device or the like out of axial alignment with the joint.

An object of the invention is to provide a leak proof joint for plural hydraulic lines where fluid lines must be run and misalignment may occur between the fluid lines and the hydraulic motor or other devices operated by the lines. In modern aircraft, for instance, there are a number of places where it is desirable to connect the end of a hydraulic motor cylinder so it may swivel in all directions with relation to its fluid operating lines whereby hydraulic operating fluid is carried to and from the hydraulic motor regardless of the distortion or misalignment of the piping and hydraulic motor.

A further object of the invention is to construct a ball joint carrying two fluid lines therethrough which will permit of considerable angularity of the lines with relation to the ball while maintaining the joints and parts of the devices fluid tight.

Another object of the invention is to so construct the ball joint that the two hydraulic lines leading therethrough will always form continuous passages regardless of their angular displacement.

As before mentioned, the present invention is particularly adaptable for attaching the end of a hydraulic or pneumatic cylinder to a supporting structure so that the end of the cylinder is permitted free swivelling motion in all directions and at the same time make it possible to use rigid type connections to the cylinder. Such connections are particularly useful in aircraft, although this invention is by no means limited to aircraft construction.

In the drawings:

Fig. 1 is a horizontal section showing the universal pipe joint arrangement with the rigid supply tubes attached thereto and joined to the end of a hydraulic cylinder;

Fig. 2 is similar to Fig. 1 but showing the arrangement of the hydraulic lines when the hydraulic motor is moved out of axial alignment with the fixed fluid lines;

Fig. 3 is an end view of Fig. 2;

Figs. 4 and 5 are diagrammatic views of the devices in operation showing the hydraulic cylinder in misalignment with its supporting socket.

The device heretofore described is useful in generally joining two fluid conduits or the like, although specifically it is here shown joining two fixed hydraulic fluid lines in a hydraulic system, and a ball and socket joint where the socket is fixed and the ball forms the end of a hydraulic cylinder. Numeral 1 denotes a conventional hydraulic cylinder having a reciprocating piston 3 therein with the end of the motor cylinder 1 bolted to an end portion comprising a swivellable ball 5. This ball-like member 5 is provided with a shank portion 7 with a fluid passage 9 passing through the ball 5 and shank 7 and opening into the end of the motor cylinder 1. A second fluid passage 11 passes through the major part of the ball 5 and the shank section 7 thereof. This second conduit 11 is blocked off by means of an end plug 13 and the discharge from the passage 11 is through fitting 15 connected through piping 17 to the far side of the hydraulic motor, not shown.

The end of the first fluid passage 9 has an enlarged diameter flared port 21 cooperating with a smaller diameter fluid opening 23 in the fixed spherical casing 25 within which the ball moves so that the passage 9 is always open, as shown in Fig. 2, regardless of the position of the ball. Fluid is admitted and discharged through fluid line 24 coupled into a fluid pressure circuit, not shown. The ball member 5 is secured in the spherical casing 25 by means of a clamp ring 27 held in place by a plate 29 bolted through corner bolts 31 into the peripheral flared edge portions 33 of the spherical casing 25.

Preferably a conventional shim 35 is placed between the edges of bolted plate 29 and the flared portions 33. The plate 29 has an inner angular shoulder 37 thereon for the support and retention of the clamp ring 27. The end opening 39 in the plate 29 is such that the ball 5 can rotate in any direction within the fixed casing 25 and is only limited by the stop shoulders 41 formed on the shank 7.

The major portion of second fluid passage 11 lies parallel to the first passage 9 and leads to lateral passage 45 which communicates with a circular groove 47 formed in the surface of the ball 5, it being observed that the diameter of the groove 47 is slightly less than the full diameter of the ball. This groove 47 cooperates with a groove 49 of similar diameter formed on the inner face of the spherical socket member 25. Hydraulic fluid is admitted and discharged through the joint by circulation thereof through line 46, grooves 47, 49, passageway 11 and line 17. The channels made up of grooves 47 and 49 are substantially coaxial and are generated on the same radius, and the cooperating fluid channel formed by the grooves is so disposed with respect to the limited range of movement of the ball member 5 and spherical member 25 that they will always intersect and permit fluid flow. The enlarged lip 21 of passage 9 is such that when the ball member 5 is moved fluid may always flow through the opening 23 in the socket member 25 and line 24.

Figs. 4 and 5 show the device with the spherical socket 25 rigidly mounted on or attached to a structural element of an aircraft 51 and with dashed lines showing the normal axial relation of the hydraulic cylinder 1, and the misalignment of the parts when the piston 3 thereof moves the link arm or other element 53.

In addition to permitting the pressure in two pressure fluid lines 24 and 46 to be moved from axial position through the movement of the ball in the socket, the ball 5 is constantly lubricated by the fluid used in the system and oil is prevented from leaking therearound by means of O-ring seals which are shown mounted in suitable grooves. Preferably a circular groove 55 provided with an O-ring 57 is formed in the fixed spherical member 25 at a point approximately the greatest diameter of the spherical socket. A second groove 59 having an O-ring 61 is formed in the ball 5 with the diameter of this groove of less than the diameter of the groove 55 in the spherical member.

Fig. 2 shows the relationship of the hydraulic motor 1 with its swivellable end after it has been moved out of axial alignment with the fixed socket 25 and the limiting lugs 41 or ball 5 has contacted the apertures 39 in the plate 37. Here the first passage 9 is still in contact with the conduit 24, due to the flared formation of the port 23, and fluid flow is maintained through the second passage 11 by means of the circumferential channels 47 and 49 in the spherical socket and ball which are always in bisecting relation. Delivery of fluid is always established through line 46, the fixed groove 49 of the spherical section 25 being in conjunction with the movable groove 47 in the outer circumference of the ball which bisects the fixed groove 49 throughout movement of the ball. The fluid can then pass into lateral passage 45 that joins groove 47 and passage 11 and thence to pipe line 17 attached to the outer end of the hydraulic cylinder, not shown.

I claim:

1. A universal pipe joint comprising a spherical socket and a swivellable ball mounted therein, a main central fluid passage extending through the fixed spherical socket and the swivellable ball and a secondary fluid passage extending radially through the fixed spherical socket and communicating with a continuous circular groove formed in the ball engaging face of the spherical socket, the said groove normally lying in parallel relation to a similar groove formed around the periphery of the said ball, and a passage joining the groove on the said ball with the secondary fluid passage in the spherical socket.

2. A universal joint comprising a spherical member and a swivellable ball mounted therein, two fluid passages formed through the said ball, one of said passages having an enlarged orifice that is always in communication with a central opening in the face of the spherical member regardless of the angular position of the ball, the second of said passages terminating in a radial section at an angle to its major portion, the outer end of this radial section communicating with a circular groove formed around the outer circumference of the ball, a second groove of substantially similar diameter formed in the spherical member, and a fluid port communicating with the circumferential groove in the spherical member.

3. A universal pipe coupling comprising a spherical socket member and a movable ball member secured therein, spaced apart fluid ports leading into the spherical socket member, one of said ports registering with a fluid passage extending through the ball, the second of said ports leading to a circumferential groove formed in the fixed socket, a similar circumferential groove of substantially the same radius formed on the movable ball member, and a fluid passage leading from the groove in the movable ball to a second fluid passage lying parallel to the first mentioned fluid passage extending through the ball wherein the said circumferential grooves bisect each other regardless of the angular position of the movable ball to the fixed socket member.

4. A plural pipe joint comprising a semi-circular socket, central and radial fluid ports therein, a cooperating ball having limited movement, secured in the said socket, an elongated stem extending from said ball, a fluid passage extending through said ball and stem and terminating adjacent the central fluid port in the said socket, a second fluid passage extending through said stem and ball, the inner end of the second passage terminating in a continuous groove on the outer surface of the said ball and a second continuous groove of the same diameter in the face of the fixed semi-circular socket, the said grooves in both the fixed socket and movable ball bisecting each other when the ball is moved from its normal axial position.

5. In combination, a hydraulic motor of the type having a cylinder and a piston therein reciprocated by hydraulic fluid applied to the opposite side of the piston and a swivel support for one end of the hydraulic motor whereby the hydraulic motor functions regardless of axial misalignment between the swivel socket and the hydraulic motor wherein the swivel socket is fixed and includes two fluid passages leading therethrough, one of said passages being positioned at the inner central portion of the sphere and the other passage radially spaced therefrom, a ball adapted to swivel in the fixed spherical socket, said ball having substantially parallel passages therethrough communicating with the said fluid passages in the said fixed socket when the socket and ball are in axial alignment, the passages in said ball extending in a casing beyond the periphery thereof to the end of the hydraulic motor, whereby fluid is introduced and discharged on both sides of the piston, the opening of the fluid passage in the ball adjacent the central passage in the fixed spherical socket being enlarged whereby fluid will flow therethrough when the normal alignment of the openings is varied, the said radially spaced passage communicating with a continuous groove cut in the face of the spherical socket at approximately its greatest diameter, the second passageway through the ball terminating in a peripheral groove of the same radius as the groove in the face of the socket whereby the said grooves are always in bisecting relation and fluid communication when the ball end of the hydraulic motor is moved out of axial alignment with the fixed socket.

THOMAS C. HILL.

REFERENCES CITED

The following references are of record in the file of this patent:

UNITED STATES PATENTS

| Number | Name | Date |
| --- | --- | --- |
| 908,414 | Mellin | Dec. 29, 1908 |
| 2,175,191 | Goyette | Oct. 10, 1939 |

FOREIGN PATENTS

| Number | Country | Date |
| --- | --- | --- |
| 235,652 | British | June 22, 1925 |